United States Patent
Maru

(10) Patent No.: US 7,402,199 B2
(45) Date of Patent: Jul. 22, 2008

(54) ADSORBING ELEMENT

(75) Inventor: Shigeo Maru, Saitama (JP)

(73) Assignees: Ueno Industry Co., Ltd., Tokyo (JP); Mahle Filter Systems Japan Corporation, Tokyo (JP)

( * ) Notice: Subject to any disclaimer, the term of this patent is extended or adjusted under 35 U.S.C. 154(b) by 515 days.

(21) Appl. No.: 11/214,065

(22) Filed: Aug. 30, 2005

(65) Prior Publication Data

US 2006/0042467 A1 Mar. 2, 2006

(30) Foreign Application Priority Data

Aug. 31, 2004 (JP) ............................. 2004-251969

(51) Int. Cl.
 *B01D 53/04* (2006.01)
(52) U.S. Cl. .......................................... 96/149; 96/154
(58) Field of Classification Search ................. 96/134, 96/135, 137, 149, 153, 154; 55/509, 521
See application file for complete search history.

(56) References Cited

U.S. PATENT DOCUMENTS

| | | | | |
|---|---|---|---|---|
| 2,038,071 A * | 4/1936 | Wilhelm ...................... 96/118 |
| 4,418,662 A * | 12/1983 | Engler et al. .................. 96/133 |
| 4,976,857 A * | 12/1990 | Solomon ................. 210/493.5 |
| 5,236,480 A * | 8/1993 | Svensson et al. ........... 55/385.2 |
| 5,320,096 A * | 6/1994 | Hans ...................... 128/205.29 |
| 5,980,612 A | 11/1999 | Kelly |
| 6,146,451 A * | 11/2000 | Sakata et al. ................... 96/135 |
| 7,168,417 B2 * | 1/2007 | Arruda et al. ................ 123/518 |
| 2003/0089092 A1 * | 5/2003 | Bause et al. ................... 55/524 |

FOREIGN PATENT DOCUMENTS

| | | |
|---|---|---|
| DE | 40 39 951 A1 | 6/1992 |
| DE | 43 43 358 A1 | 6/1995 |
| JP | 3007311 B2 | 11/1999 |
| JP | 2003-024896 A | 1/2003 |
| JP | 2003-320209 A | 11/2003 |
| JP | 2004-100691 A | 4/2004 |

* cited by examiner

*Primary Examiner*—Frank M. Lawrence
(74) *Attorney, Agent, or Firm*—Foley & Lardner LLP

(57) ABSTRACT

An adsorbing element for adsorbing and releasing a gas includes a plurality of adsorbing sheets. Each adsorbing sheet includes gas-permeable sheets such as non-woven fabrics or filter papers, and an adsorbing material filled between the gas-permeable sheets. First and second supporting members are provided such that each of them is formed of a paper-like sheet formed with a plurality of pleats which have straight trough lines. Each of the pleats of the first supporting member is located facing and spaced from each of the pleats of the second supporting member to form a pair of the facing pleats, defining a pair of facing trough portions. In this adsorbing element, the first and second side edges of each adsorbing sheet are located respectively at the pair of facing trough portions so that each adsorbing sheet is supported between the pair of the facing trough portions.

4 Claims, 7 Drawing Sheets

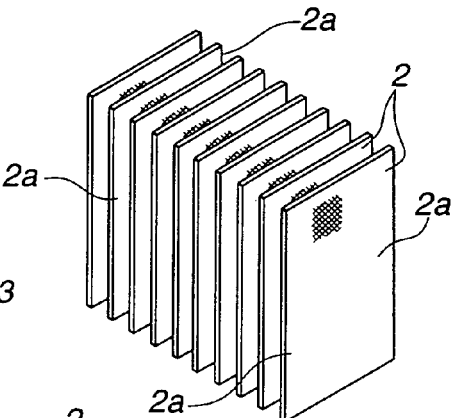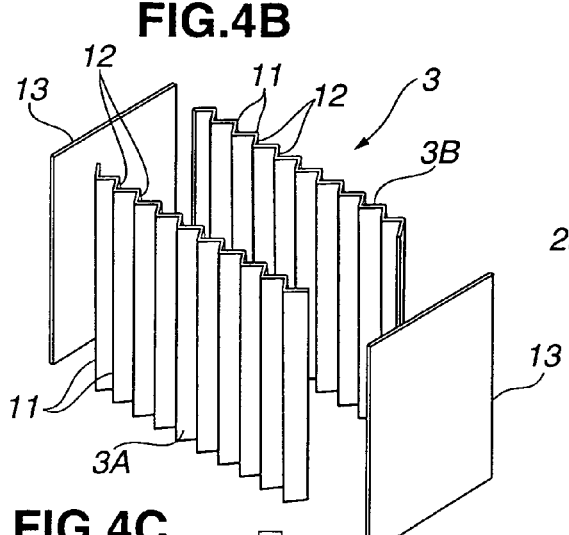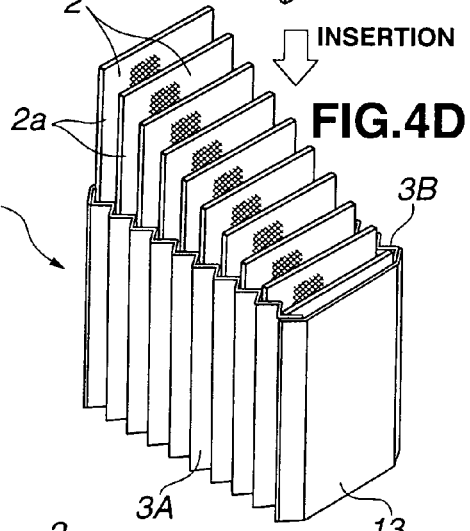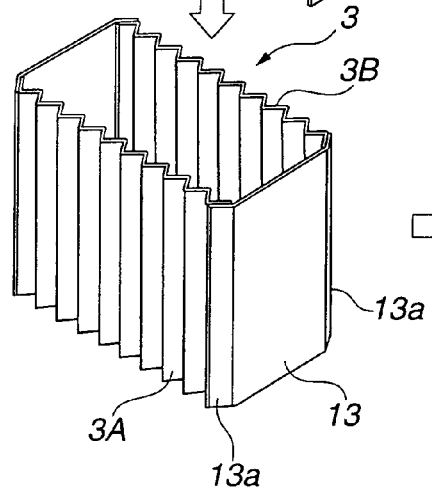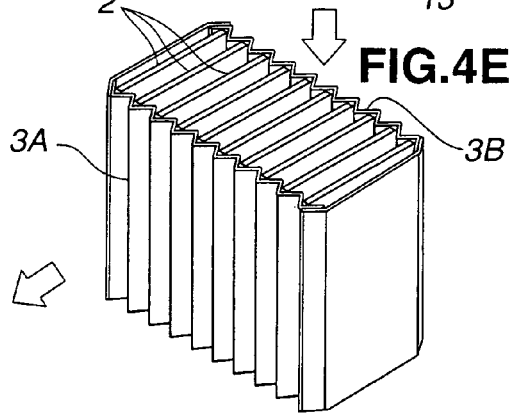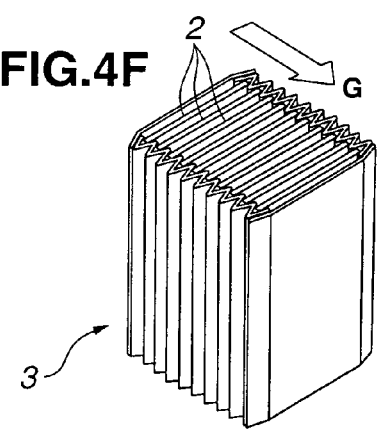

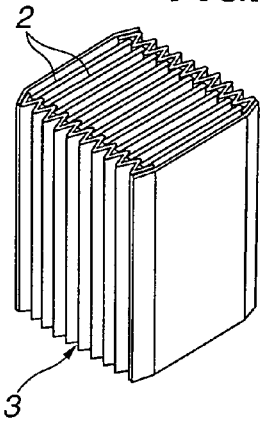
FIG.4F
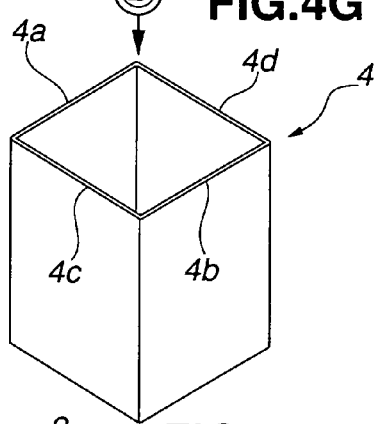
FIG.4G
FIG.4J
FIG.4H
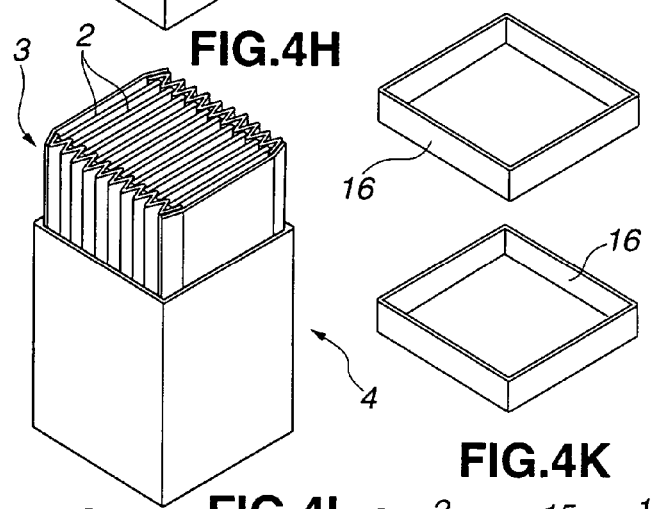
FIG.4M  FIG.4I  FIG.4K
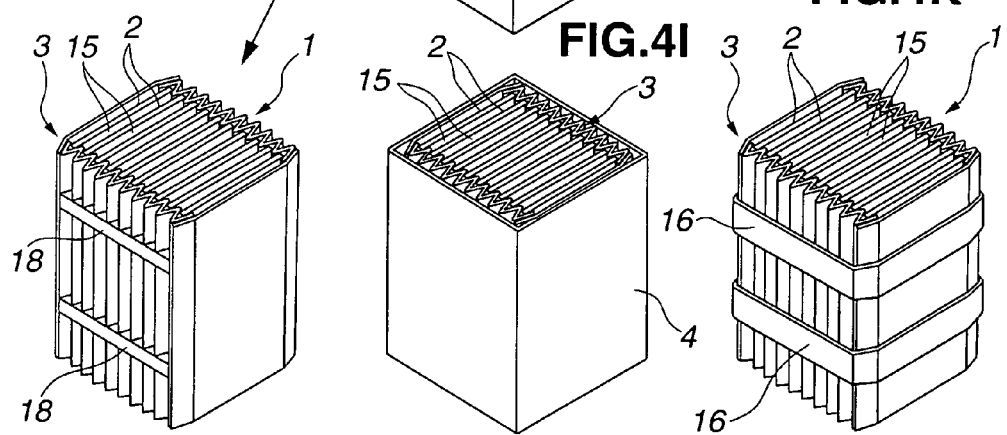

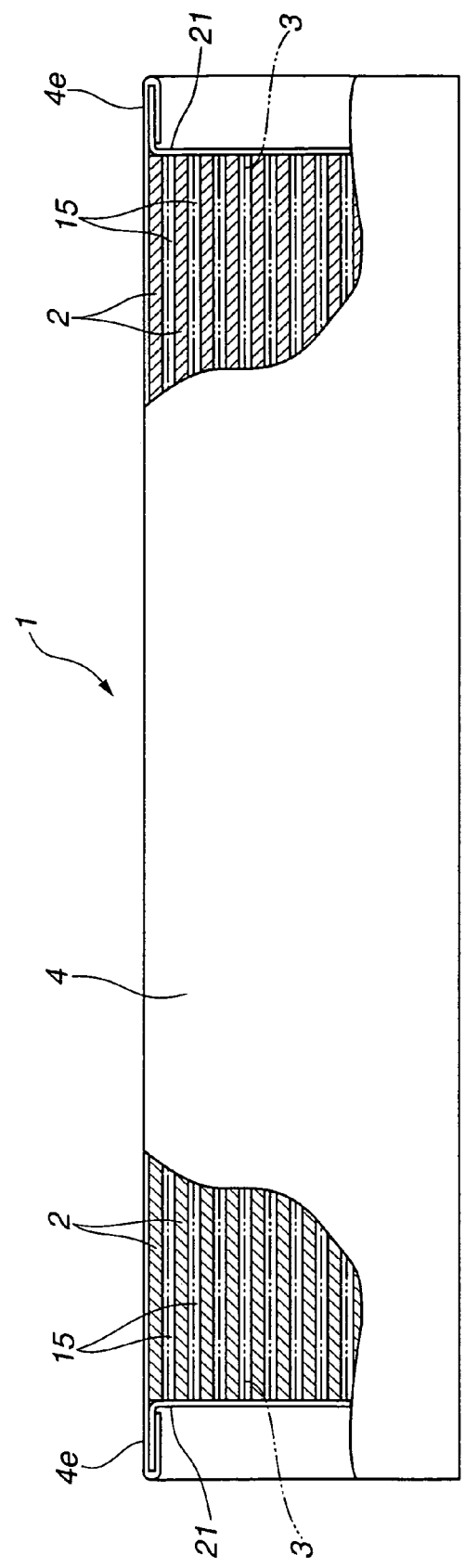

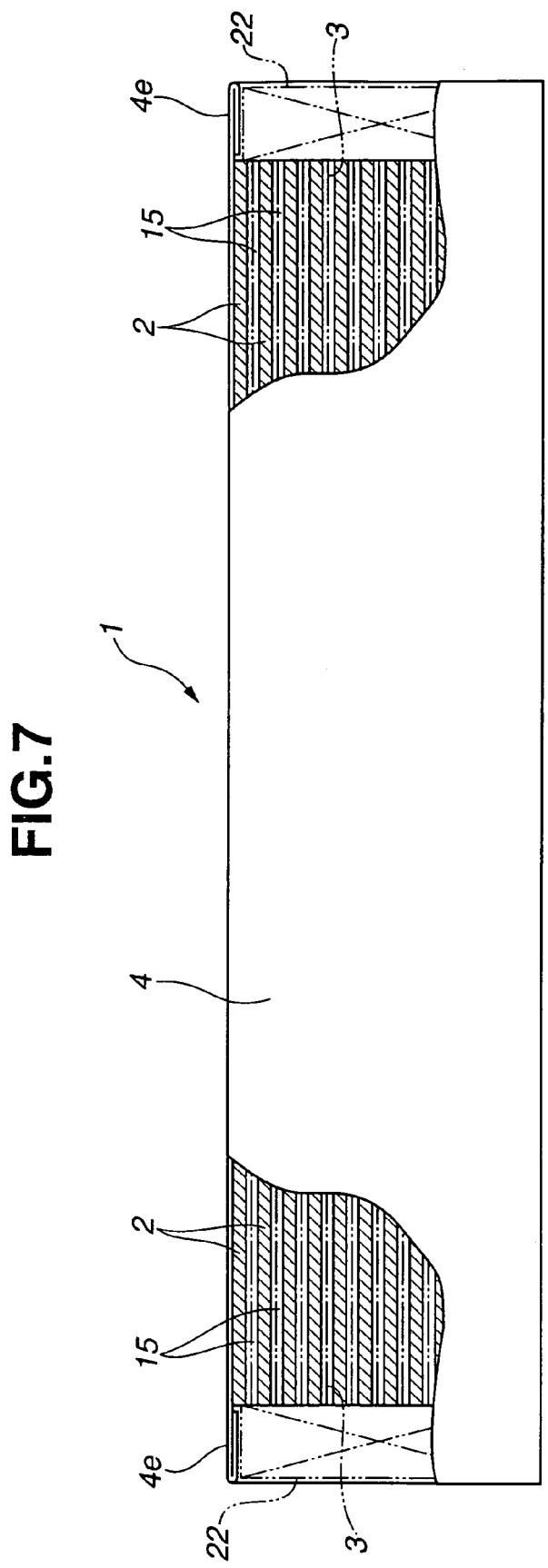

ADSORBING ELEMENT

BACKGROUND OF THE INVENTION

1. Field of the Invention

The invention relates to an adsorbing element that adsorbs and releases foul odors, harmful gases or fuel gases.

2. Description of the Related Art

JP-A-2003-24896 discloses a raw garbage processor in which raw garbage from homes is dried and processed under agitation while supplying hot air. In this kind of devices, in an exhaust path through which an exhaust gas flows from a dryer vessel, a deodorizing device is disposed to remove the foul odors. Japanese Patent No. 3,007,311, discloses as a deodorizing filter that is used in such a deodorizing device, a cylindrical structure in which a sheet material formed by intervening a pulp containing a deodorant and a water-absorbing polymer between a non-woven fabric and a resin film is wound in honeycomb.

Furthermore, JP-A-2004-100691 relates to an evaporative fuel treatment apparatus that adsorbs a fuel component vaporized from a fuel tank of an automobile and releases, followed by being burned during engine operation. JP-A-2004-100691 discloses the fact that besides grained activated carbon being packed as it is in a vessel to use, a formed absorbing material as an adsorption cartridge is integrally formed into a cylindrical honeycomb to use.

Still furthermore, JP-A-2003-320209 discloses a deodorizing filter in which an adsorbing material made of activated carbon is filled together with a hot-melt adhesive between non-woven fabrics on both sides, followed by heating and pressurizing to form into a sheet, further followed by folding the sheet-like one at a constant interval a plurality of times into a pleat-like shape is disclosed. The deodorizing filter also serves to remove dust; accordingly, a gas penetrates through a sheet material of the deodorizing filter.

Although a structure where granular and formed activated carbon or pulverized activated carbon is packed as it is in a container is simple, the air flow resistance is high; accordingly, it cannot be applied to the use where low air flow resistance is necessary. A formed adsorbing material or formed activated carbon that is integrally formed into a honeycomb shape can be constituted low in the air flow resistance. However, since the molding cost is high and molds for molding into individual honeycomb shapes corresponding to devices such as deodorizing devices are necessary, in particular, it is not suitable for limited production of diversified products.

On the other hand, as disclosed in Japanese Patent No. 3,007,311 and JP-A-2003-320209, in the case of an adsorbing sheet formed into a sheet with an adsorbing material interposed between non-woven fabrics being used, when the adsorbing sheet is wound into a cylinder or formed into a pleat with folded pleats, various kinds of capacities or sizes of adsorbing elements can be readily obtained. However, such the adsorbing sheet, being provided with the adsorbing material in the middle, has a certain thickness; accordingly, in actuality, it cannot be folded so fine. For instance, in Japanese Patent No. 3,007,311, although a finely corrugated sheet material is wound into a honeycomb, in actuality, it is difficult to finely fold into a corrugated shape. Furthermore, when the adsorbing sheet is folded into a pleat as well, unless an interval of the respective pleats, namely, a pitch of pleat is made larger to a certain extent, in a folding line, a non-woven fabric on a surface is likely to be broken.

BRIEF SUMMARY OF THE INVENTION

It is an object of the present invention to provide an improved adsorbing element which can effectively overcome drawbacks encountered in conventional adsorbing elements of the similar nature.

Another object of the present invention is to provide an improved adsorbing element which is very simple in construction while low in air flow resistance.

A further object of the present invention is to provide an improved adsorbing element which has a plurality of adsorbing sheets which are not required to be bent, so that the adsorbing sheets do not encounter such a shortcoming as to be broken at a bent portion.

According to the present invention, an adsorbing element comprises a plurality of adsorbing sheets. Each adsorbing sheet includes gas-permeable sheets selected from the group consisting of non-woven fabrics and filter papers, and an adsorbing material filled between the gas-permeable sheets. Each adsorbing sheet is formed sheet-like and has first and second side edges which are straight and located at opposite sides of the adsorbing sheet. First and second supporting members are provided such that each of them is formed of a paper-like sheet formed with a plurality of pleats each of which is formed by folding the paper-like sheet at a flat state, the pleats having straight trough lines. Each of the pleats of the first supporting member is located facing and spaced from each of the pleats of the second supporting member to form a pair of the facing pleats. The pair of the facing pleats define a pair of facing trough portions. In this adsorbing element, the first and second side edges of each adsorbing sheet are located respectively at the pair of facing trough portions so that each adsorbing sheet is supported between the pair of the facing trough portions.

The adsorbing element according to the invention is roughly constituted of a plurality of adsorbing sheets and a supporting member that supports the adsorbing sheets in a stacked state. The adsorbing sheet has an adsorbing material interposed between gas-permeable non-woven fabrics or papers on both sides, is formed into a sheet-shape and has an external shape having linear side edges on both sides, for instance, a rectangular shape. The supporting member is made of a paper-like sheet such as a filter paper or a non-woven fabric that is formed by being folded so as to have a plurality of pleats of which trough line is along a straight line. The plurality of pleats include a pair of pleats which are spacedly oppositely disposed. The paper-like sheet that becomes a supporting member is typically made of a pair of mutually separated paper-like sheets that are oppositely disposed, each of the paper-like sheets is provided with a plurality of pleats so as to mutually face. Alternatively, a pair of pleated portions may be connected at a center portion thereof to form one paper-like sheet. Between mutually facing troughs of the supporting members, side edges of each of the adsorbing sheets are interposed and supported. That is, a plurality of adsorbing sheets is supported by the supporting members at the side edges on both sides thereof and held in a state where a plurality of sheets is stacked. Between the adsorbing sheets, a gap corresponding to a pitch of the pleats remain and both sides of the respective gaps are clogged with the supporting member. Accordingly, a gas is introduced in the respective gaps that become a path along a longer direction of the pleat, namely, along a surface of the adsorbing sheet. Accordingly, the ventilation resistance can be made smaller.

As the adsorbing materials, fine granular activated carbon (pulverized activated carbon or formed activated carbon), silica, alumina, or various kinds of metals and oxides thereof having the adsorbing property, that is, all of known adsorbing materials can be used according to ingredients to be adsorbed and the required characteristics. For instance, as needs arise, a proper binder is added thereto, followed by filling the binder between non-woven fabrics or papers on both sides, further followed by pressurizing and heating, and thereby forming into a thin sheet. As a specific manufacturing method of the adsorbing sheet, without restricting thereto, any other method may be used.

In thus configured adsorbing element according to the invention, the adsorbing sheets themselves are flat, not necessarily folded, and can be supported in a state where the respective adsorbing sheets are stacked with a relatively small gap by use of the supporting member made of pleated paper-like sheet. Accordingly, as a whole, it can be structured very simple and at low cost. The number of adsorbing sheets being stacked, the pitch thereof, and an external shape can be readily altered in accordance with requirements.

In the adsorbing element according to the invention, a plurality of adsorbing sheets is independent from each other. Accordingly, among the plurality of adsorbing sheets, a plurality of kinds of adsorbing sheets having different adsorbing materials can be included. Accordingly, adsorbing materials respectively appropriate for, for instance, a plurality of hazardous ingredients can be used to adsorb and remove.

Thus configured adsorbing element can be installed as it is in a device such as a deodorizing device. However, in order that combined adsorbing sheets and supporting member may not come apart, the periphery thereof is desirably restrained permanently or temporarily with whatever means.

According to one mode, an adsorbing element according to the invention is further provided with a cylindrical case that externally restraints the supporting members with the adsorbing sheets interposed therebetween. Preferably, the supporting members that form a bellows shape in combination with the adsorbing sheets are housed in the case upon being compressed in a direction (or stacking direction) in which the plurality of adsorbing sheets are stacked or approach each other. Here, the supporting member compressed and inserted in the case tends to extend bellows-like owing to the restoration force thereof (depending on a mode, a restoration force of the respective adsorbing sheets receiving a compressive force in a thickness direction is added as well). Accordingly, it comes into contact under pressure with the case from the inside thereof. As a result, without adhering in the case, under a pressure contact force, the adsorbing element can be supported in the case. The case can be made into, for instance, a rectangular columnar shape.

In another mode, the supporting members that form a bellows shape in combination with the adsorbing sheets are circumferentially restrained with a band-like member in a state compressed in a direction in which a plurality of adsorbing sheets are stacked or approach each other. As the band-like member, for instance, one in which rectangles are in advance connected in a ring is used, and when inside thereof the adsorbing element is inserted in a compressed state, the band-like member can be attached to an external periphery of the adsorbing element. As mentioned above, the supporting member tends to elongate bellows-like. Accordingly, owing to the restoration force thereof, the band-like member is retained and the whole of the adsorbing element is restrained so as not to separate.

In a still another mode, the supporting members that form a bellows-like shape in combination with the adsorbing sheet, in a state compressed in a direction in which a plurality of adsorbing sheets are stacked or approach each other, are solidly held with an adhesive.

BRIEF DESCRIPTION OF THE DRAWINGS

FIGS. 4A to 4M are explanatory diagrams showing a manufacturing process of the adsorbing element;

FIG. 6 is a side view of the adsorbing element, cutting out a part of a case of the adsorbing element; and FIG. 7 is a side view similar to FIG. 6 but showing a modified embodiment in which a thicker filter is used.

DETAILED DESCRIPTION OF THE INVENTION

Figure 1:
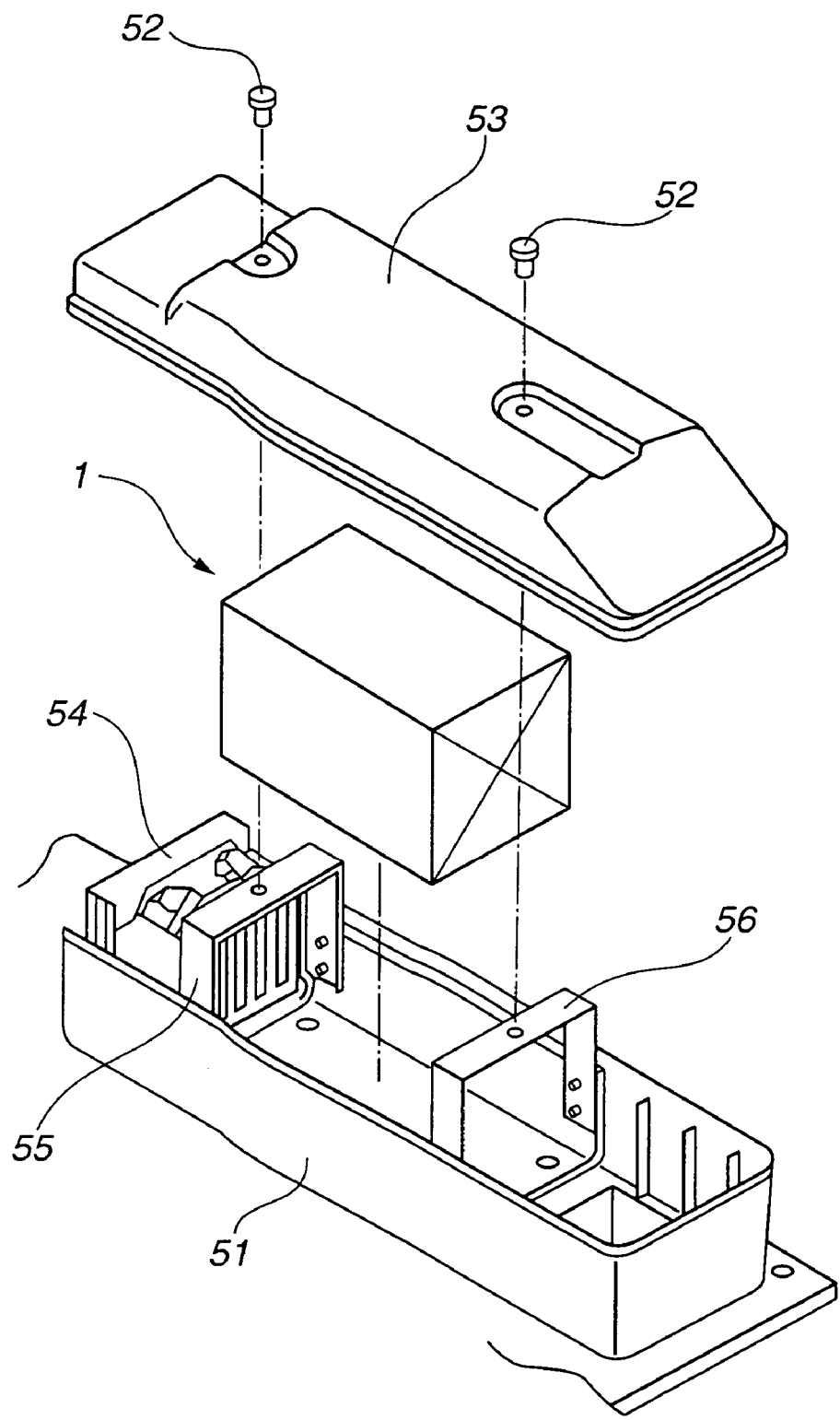
FIG. 1 is an exploded perspective view of a deodorizing device for a garbage drying processor in which an adsorbing element according to the present invention is used.
Figure 2:
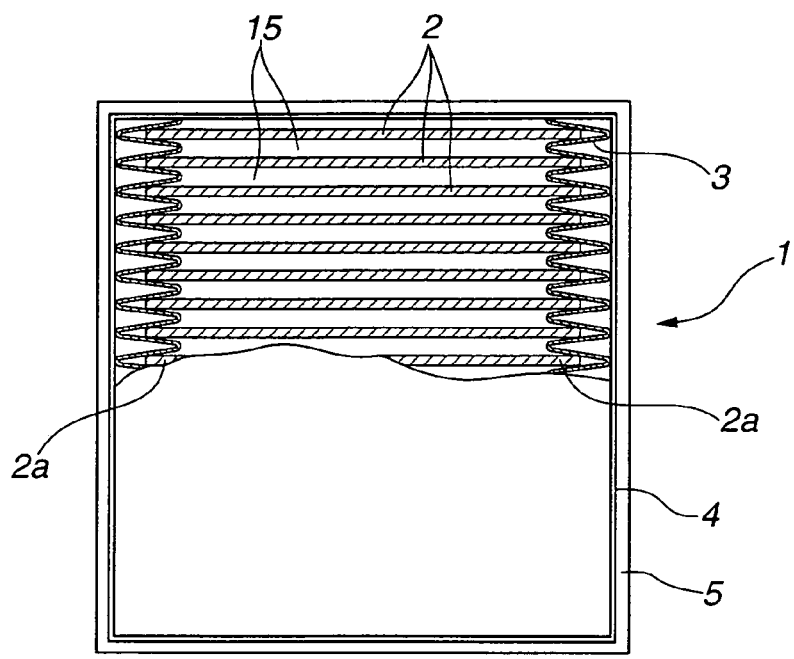
FIG. 2 is a front view, partly in section, of an embodiment of the adsorbing element of FIG. 1.
Figure 3:
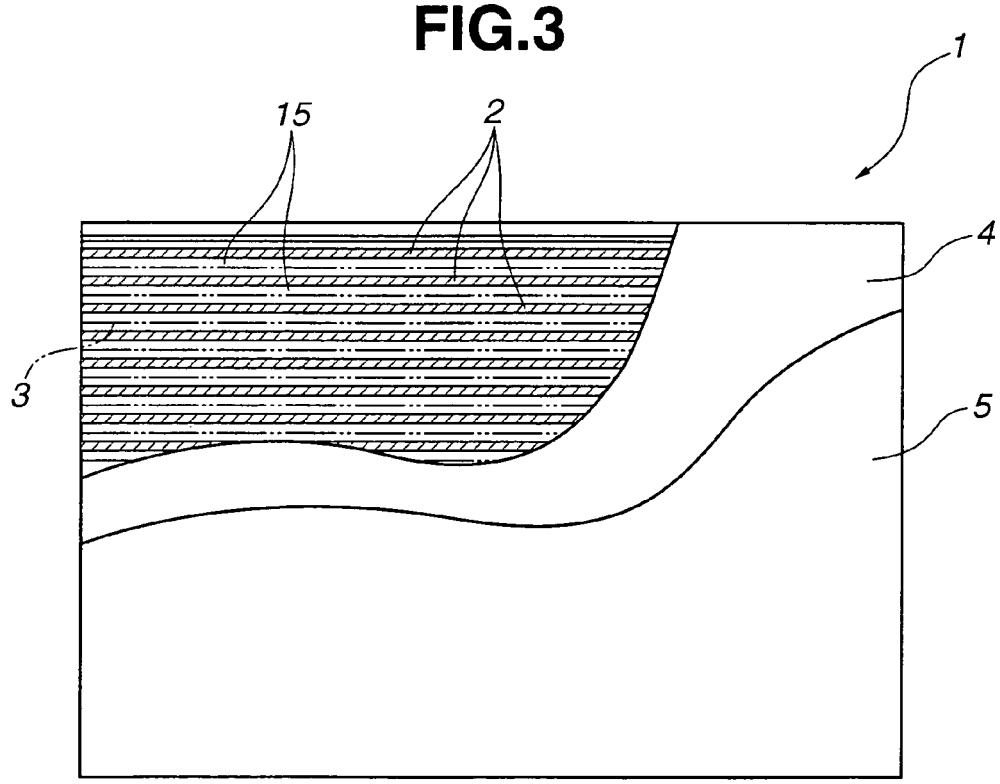
FIG. 3 is a side view of the adsorbing element of FIG. 2, in which a part of a case is cutout.

Referring now to FIGS. 1 to 3 of the drawings, an embodiment of an adsorbing element according to the present invention will be discussed.

FIG. 1 is an exploded perspective view of a deodorizing device for a garbage drying processor in which an adsorbing element according to the invention is used. The deodorizing device includes a slender rectangular body 51 disposed in an exhaust path of a garbage drying processor (not shown). A cover 53 is attached to the body 51 with a screw 52 so as to cover a top surface opening of the body 51. At one end of the inside of the body 51, a blower unit 54 is attached to blow air. A rectangular columnar adsorbing element 1 according to the present invention is fixed and supported in series with the blower unit 54 through front and rear supporting metal fittings 55 and 56.

FIGS. 2 and 3 are, respectively, a front view and a side view of the adsorbing element 1. The adsorbing element 1 includes a plurality of rectangular adsorbing sheets 2. Supporting members 3 are provided to support the adsorbing sheets 2 at side edge portions 2a on both sides. A rectangular columnar paper case 4 restrains the adsorbing sheets 2 and the supporting members 3 at outer periphery sides. A polyurethane sheet 5 is adhered onto an outer surface of the case 4 to seal a gap in the periphery in a state installed in the body 51.

Figure 5:
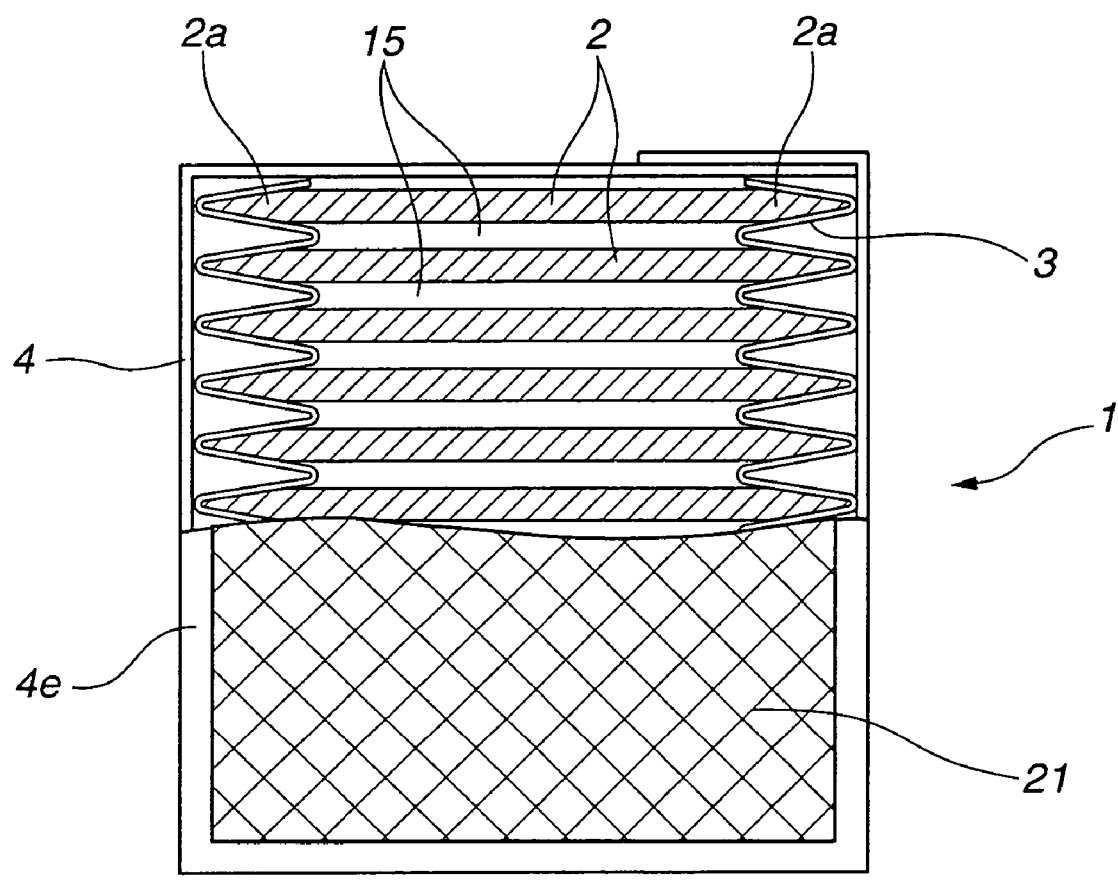
FIG. 5 is a front view of an embodiment of an adsorbing element that is used in an evaporative fuel treatment apparatus.

FIGS. 4 and 5 show a manufacturing process of the adsorbing element 1, which will be discussed hereinafter. The adsorbing sheet 2, similarly to ones in Japanese Patent No. 3,007,311 and JP-A-2003-320209, is one that is provided with gas permeable sheets such as non-woven fabrics or thin papers on both sides. Between the gas-permeable sheets, as an adsorbing material, fine powdery activated carbon (pulverized activated carbon or formed activated carbon) is filled together with a hot-melt binder, followed by pressurizing and heating to form into a sheet. For instance, by forming the sheet into a continuous band shape with a predetermined width followed by cutting this into a definite length, a rectangular, namely, strip-like shape is formed. Accordingly, a pair of side edges 2a of each of the adsorbing sheets 2 form straight lines parallel with each other. In this embodiment, all the adsorbing sheets 2 form the same shape (see a step shown in FIG. 4A).

The supporting member 3, as shown in a step of FIG. 4B, in this embodiment, is formed of a pair of mutually separated rectangular paper-like sheets 3A and 3B such as filter papers containing polyester fibers. The paper-like sheets 3A, 3B may be sheet-like non-woven fabrics, sheets formed of synthetic fibers such as polyester fibers or rayon fibers, or like sheets. When each of the paper-like sheets 3A and 3B is folded back at a constant interval, a plurality of pleats alternately having a trough portion 11 and a ridge portion 12 is formed. A pair of pleated paper-like sheets 3A and 3B have the same shape as each other and is disposed oppositely to each other so as to be symmetrical. Accordingly, between one paper-like sheet 3A and the other paper-like sheet 3B, the same number of pleats face each other as pairs. The trough portion 11 and ridge portion 12 form the same V-shaped sectional shape. Here, a portion that projects outward when disposed facing each other is called the trough portion 11 and a portion that projects inward is called the ridge portion 12. Folding lines of the trough portions 11, that is, trough lines are all straight line-like, and, in this embodiment, on spread paper-like sheets 3A and 3B, these lines run in parallel with each other.

The pair of paper-like sheets 3A and 3B that form a supporting member 3 can be used as they are in a mutually separated and independent state. In FIGS. 2 and 3, embodiments of such separated supporting member 3 are shown. On the other hand, as shown in steps shown respectively in FIG. 4B and FIG. 4C, at each of both ends of a pair of pleated paper-like sheets 3A and 3B, a rectangular side sheet 13 made of for instance a filter paper may be combined. In the side sheet 13, both side edges 13a thereof are joined to end edges (the last side of the pleat) of the pleated paper-like sheets 3A and 3B with for instance an adhesive. Alternatively, these may be heated and joined by means of ultrasonic bonding or the like. Furthermore, without joining, the side edges 13a may be folded in a V-shape and interposed in pleats at the ends of the pair of paper-like sheets 3A and 3B. In a series of shapes including a portion corresponding to the side sheet 13, the whole of the supporting member 3 can be formed from one paper-like sheet.

To the supporting member 3, as shown in steps shown respectively in FIGS. 4D and 4E, each of the adsorbing sheets 2 is inserted between a pair of mutually facing troughs 11 of the supporting member 3. That is, the side edges 2a of the respective adsorbing sheets 2 are supported in a state interposed between the trough portions 11 of the respective pleats so that a plurality of adsorbing sheets 2 are disposed in a state stacked with a definite separation. A length of the adsorbing sheet 2 (a dimension in a direction along a side edge 2a) and a length dimension along pleats of the paper-like sheets 3A and 3B coincide with each other.

With this, a fundamental configuration of the adsorbing element 1 comes to completion. However, in this embodiment, this one is further inserted into a rectangular columnar case 4. That is, a bellows-shaped fundamental adsorbing element 1 that is formed by combining the supporting member 3 and the plurality of adsorbing sheets 2, as shown in the step shown in FIG. 4F, is compressed by pressing in a direction of an arrow mark G. In this state, as shown in steps shown respectively in FIGS. 4G and 4H, the adsorbing element 1 is inserted into the case 4 previously formed into a rectangular column. The case 4 is made of a filter paper similar to for instance the supporting member 3 and joined in a rectangular column with an adhesive or by means of the ultrasonic bonding. The fundamental adsorbing element 1 inserted in the case 4 in a compressed state, owing to the restoration force of the pleated supporting member 3 itself and that of the respective adsorbing sheets 2 that receives the compressive force in a thickness direction, tends to extend again into the bellows shape. Accordingly, the fundamental adsorbing element 1 comes into contact under pressure with interiors of a pair of facing walls 4a and 4b of the case 4 and, with the compressive force itself, is solidly supported by the case 4. Furthermore, the supporting member 3 is maintained compressed to a certain degree. Accordingly, the adsorbing sheet 2 interposed between the troughs 11 thereof does not come off. Accordingly, as shown in the step shown in FIG. 4I, the adsorbing element 1 provided with the case 4 is obtained in an integrally assembled state. Here, ridge lines of the respective ridges 12 of the supporting member 3 are in a gapless manner in proximity to the internal sides of the remaining two walls 4c and 4d that face each other. A polyurethane sheet 5 disposed on an outer surface of the case 4 may be adhered with an adhesive to the outer surface of the case 4 after the step shown in FIG. 4I, or alternatively, in the step shown in FIG. 4G before the insertion of the adsorbing sheet 2, the sheet 5 may be disposed on the outer surface of the case 4.

In the adsorbing element 1 thus constituted, a lot of adsorbing sheets 2 are stacked with a slight gap 15. In the structure, air flows along a longitudinal direction of the case 4 through the respective gaps 15 and in the meantime the adsorbing sheets 2 adjacent to the gaps 15 adsorb and remove odor ingredients. Accordingly, the path can be set at sufficiently low air flow resistance. Furthermore, the entirety, being formed of paper or non-woven fabric, including activated carbon, can be incinerated; that is, the disposal can be readily carried out. In a configuration provided with the case 4 like in this embodiment, since the adsorbing element 1 can be handled as a so-called cartridge type, the handling thereof and attaching and detaching thereof from the body 51 of the deodorizing device become convenient. As materials of the case 4, other than the filter paper, various kinds of papers, non-woven fabrics and synthetic resins can be used.

In this embodiment, the plurality of adsorbing sheets 2 have the same configuration; however, also by combining a plurality of kinds of adsorbing sheets 2 of which adsorbing materials have characteristics different from each other, one adsorbing element 1 may be constituted.

Next, in steps shown respectively in FIGS. 4J and 4K, an embodiment where in place of the case 4 in the above embodiment, a pair of band-shaped members 16 are used to restrain an outer periphery is shown. The band-shaped member 16 is one obtained by joining for instance tape-shaped papers (for instance, filter paper) with a predetermined width into a rectangular ring. Similarly to the case where the case 4 is used, a fundamental adsorbing element 1 made of the supporting member 3 and the adsorbing sheets 2 is inserted around an outer periphery thereof under pressure. As mentioned above, the fundamental adsorbing element 1 inserted in a compressed state in an inner periphery of the band-shaped member 16, owing to the restoration force thereof, tends to extends again to the bellows-shape. Accordingly, the adsorbing element 1 comes into contact under pressure with the band-shaped member 16 from the inside, and, utterly similarly to the case where the case 4 is provided, the whole of the adsorbing element 1 is integrally supported. As the band-shaped member 16, a slender string-shaped one and one made of rubber can be used. Furthermore, the band-shaped member 16 may be installed permanently or temporarily to the adsorbing element 1; that is, the adsorbing element 1 may be installed, as provided with the band-shaped member 16, in a device such as a deodorizing device, alternatively, before installing into the device, with the band-shaped member 16 removed, only the fundamental adsorbing element 1 may be installed in the device.

A step shown in FIG. 4M illustrates also an embodiment in which the case 4 is not provided. In this embodiment, in a compressed state as shown in the step of FIG. 4F, on outer surfaces of the pleated paper-like sheets 3A and 3B, an adhesive 18 having an appropriate viscosity is coated in continuous band shapes and thereby after curing the supporting member 3 is solidly supported in a compressed state. The adhesive 18 is coated in a plurality of parallel lines (for instance 2 lines) at an appropriate interval.

Subsequently, an embodiment where the invention is applied to an adsorbing element 1 that is used as an adsorbing material cartridge of an evaporative fuel treatment apparatus like JP-A-2004-100691 will be described with reference to FIGS. 5 and 6. In the embodiment as well, since a fundamental configuration is not different from that of the foregoing embodiment, mainly, different points thereof will be described.

FIGS. 5 and 6, respectively, are a front view and a side view of an adsorbing element 1 and the adsorbing element 1, similarly to the foregoing embodiment, includes a plurality of rectangular adsorbing sheets 2. A supporting member 3 is provided to support the adsorbing sheets 2 at side edges 2a on both sides. A rectangular columnar paper case 4 restrains the adsorbing sheets 2 and the supporting member 3 on an outer periphery sides thereof. Additionally, a mesh filter 21 is provided at each of openings on both ends of the case 4.

In this embodiment, a length of the case 4 in a longer direction is set longer than that of the supporting member 3 and the adsorbing sheet 2. When the supporting members 3 are inserted in the case 4 together with the adsorbing sheets 2 as shown in the steps respectively in FIGS. 4H and 4I, excess portions 4e are generated at both ends of the case 4. When the excess portion 4e is folded back inside of the case 4, as shown in FIG. 6, from a position a half way of a projected length, the supporting members 3 and the adsorbing sheets 2 in the case 4 can be assuredly restrained from moving. Furthermore, the filter 21 is disposed so that dust in the air may be removed and further more activated carbon particles collapsed from end edges (in particular, end edges facing the opening of the case 4) of the adsorbing sheets 2 are left not to intrude into a downstream side of the evaporative fuel treatment apparatus, resultantly, in an intake system of an internal combustion engine. For instance, when, after a plurality of sheets of synthetic resin mesh is piled up, a peripheral portion thereof is inserted inside of the folded portion of the excess portion 4e of the case 4, the filter 21 is attached to the opening at the end of the case 4.

When a strip-like adsorbing sheet 2 is formed, the end edges and the side edges toward openings at both ends of the case 4 can be sealed bag-like by adhering the end edges of for instance papers or non-woven fabrics on both surfaces or by solidifying with an adhesive. When the end edges of the adsorbing sheets 2 are thus formed in a closed structure, since there is no risk of the activated carbon coming off the end edges, the filter 21 at both ends of the case 4 can be omitted.

As the adsorbing element 1 for the evaporative fuel treatment apparatus, different from the adsorbing element 1 for the deodorizing device, the resistance characteristics against fuel components such as gasoline is necessary. Accordingly, as a paper material forming the supporting member 3 and case 4, a filter paper generally used in a fuel filter such as a filter paper containing polyester fibers can be preferably used. When the respective parts of the case 4 are joined, without using an adhesive, for instance the ultrasonic bonding is desirably used to join.

As the filter paper that constituting the case 4, in particular, a filter paper corrugated in advance may be used. In this case, when the case 4 is installed in a casing of the evaporative fuel treatment apparatus, the case 4 itself has a little cushioning property. Accordingly, without utilizing the cushioning member such as the polyurethane sheet 5 of the embodiment, the saccadic movement in the evaporative fuel treatment apparatus can be avoided.

As an adsorbing agent filled in the adsorbing sheet 2, without restricting to the activated carbon, various kinds of materials can be used. Furthermore, as known so far, in order to increase the adsorbing and releasing potential of the fuel components, a heat accumulating material may be mixed.

Furthermore, in the embodiment, as a filter at both ends of the case 4, the mesh filter 21 is exemplified; however, the invention, without restricting thereto, can use a filter paper, a non-woven fabric, polyurethane (sheet-like, mat-like) and so on. FIG. 7 shows an embodiment where inside of the excess portions 4e of the both ends of the case 4 a filter 22 made of a non-woven fabric having a thickness is disposed. Such filters 21 and 22 can be adopted also in the deodorant adsorbing element 1, and, without disposing the excess portion 4e of the case 4 as mentioned above, can be disposed at ends of the adsorbing element 1.

As appreciated from the above, according to the invention, an adsorbing element having a very simple structure basically made of adsorbing sheets and paper-like sheets can be obtained. Since a gas flows through gaps between the respective adsorbing sheets, the ventilation resistance can be made smaller, and furthermore, since there is no need of folding the adsorbing sheet, inconveniences such as breaks of a surface at the folding portions are not caused. Furthermore, the number of stacking adsorbing sheets, a pitch thereof, and an external shape thereof can be readily altered depending on requirements.

In the above, although some embodiments are described, the invention is not restricted to the embodiments and can be variously modified. For instance, in the foregoing embodiments, the whole of the adsorbing elements are formed into a simple rectangular column. However, by varying external shapes of the individual adsorbing sheets 2 and layouts of pleats of the supporting member 3, various kinds of different shapes can be formed. In the foregoing embodiments, many adsorbing sheets have the same external shape. However, without restricting thereto, for instance, also with a plurality of adsorbing sheets of which width dimensions (a dimension between a pair of side edges) gradually vary, the adsorbing element according to the invention can be formed. Furthermore, the invention can be applied not only to the deodorizing devices and evaporative fuel treatment apparatus but also to various applications. For instance, the invention can be applied to, for instance, a humidifying agent that gradually releases water content held in an adsorbing element.

The entire contents of Japanese Patent Application No. P2004-251969, filed Aug. 31, 2004, are incorporated herein by reference.

What is claimed is:

1. An adsorbing element comprising:
  a plurality of adsorbing sheets, each adsorbing sheet including gas-permeable sheets selected from the group consisting of non-woven fabrics and filter papers, and an adsorbing material filled between the gas-permeable sheets, each adsorbing sheet being formed sheet-like and having first and second side edges which are straight and located at opposite sides of the adsorbing sheet; and
  first and second supporting members each of which is formed of a paper-like sheet formed with a plurality of pleats each of which is formed by folding the paper-like sheet at a flat state, the pleats having straight trough lines, each of the pleats of the first supporting member being located facing and spaced from one of the pleats of the second supporting member to form a pair of facing pleats, each pair of facing pleats defining a pair of facing trough portions, wherein the first and second side edges of each adsorbing sheet are located respectively at one pair of facing trough portions so that each adsorbing sheet is supported between its respective pair of facing trough portions.

2. The adsorbing element according to claim 1, further comprising a cylindrical case for restraining the first and second supporting members at an outer peripheral portion in a state where each adsorbing sheet is supported between its respective pair of facing trough portions.

3. The adsorbing element according to claim 1, further comprising a band-like member for restraining the first and second supporting members at an outer peripheral portion in a state where each adsorbing sheet is supported between its respective pair of facing trough portions.

4. The adsorbing element according to claim 1, wherein the supporting members form a bellows-shape in combination with the adsorbing sheets and are maintained in a compressed state in a stacking direction of the plurality of adsorbing sheets.

* * * * *